Oct. 21, 1930.     N. H. CLOUGH     1,779,269
TRANSFORMER, CHOKE COIL, AND CORE THEREFOR
Filed May 26, 1926
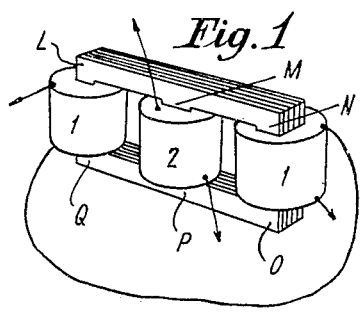
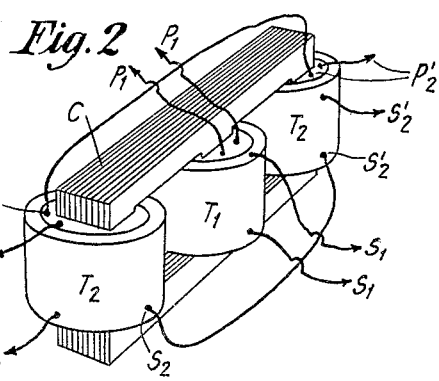
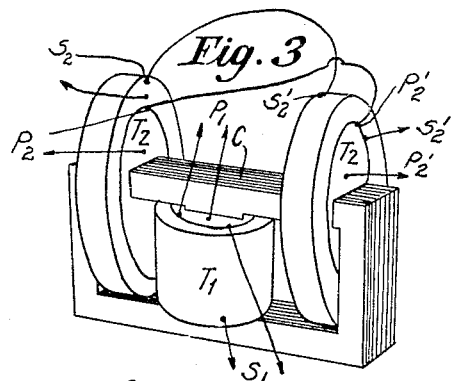
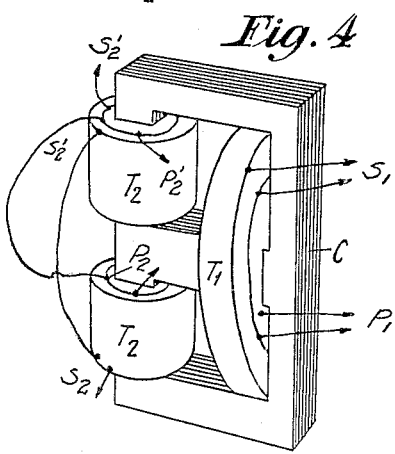
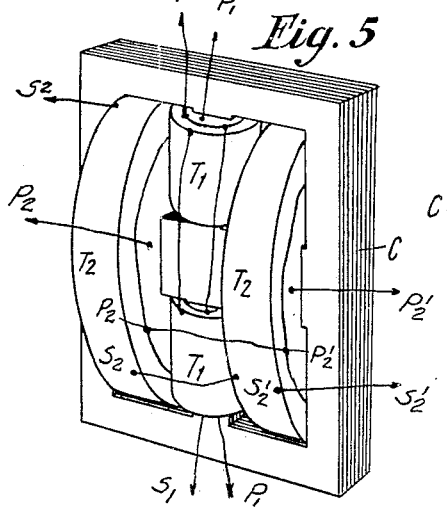
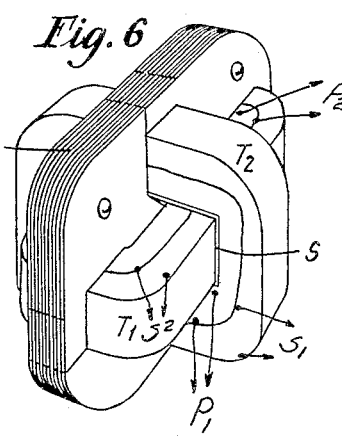
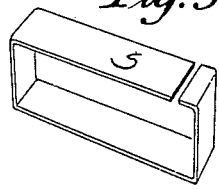
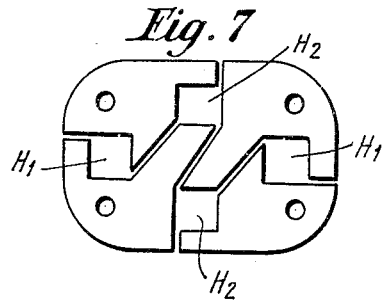
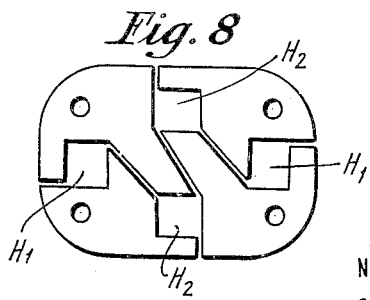
Inventor
NEWSOME HENRY CLOUGH
By his Attorney Patented Oct. 21, 1930

1,779,269

UNITED STATES PATENT OFFICE

NEWSOME HENRY CLOUGH, OF HANWELL, LONDON, ENGLAND, ASSIGNOR TO RADIO CORPORATION OF AMERICA, A CORPORATION OF DELAWARE

TRANSFORMER, CHOKE COIL AND CORE THEREFOR

Application filed May 26, 1926, Serial No. 111,849, and in Great Britain May 26, 1925.

This invention relates to core transformers, choke coils and cores therefor, for use in telegraphy and telephony, and has for its object the provision in a single unit and on a single core of a plurality of transformers, choke coils and cores therefor, each of which may be employed in a separate circuit without interfering with the other.

According to this invention, I mount on a single core the coils of a plurality of transformers, chokes or the like, and so arrange the said coils that a rate of change of current in one coil or set of coils does not cause a rate of change of current in another coil or set of coils.

According to one feature of the invention, I mount on a single core the coils of a plurality of transformers, choke coils or the like, and sub-divide the coils for one or more thereof into parts which are connected in series and so arranged that the algebraic sum of the electro-motive forces in the said parts of any transformer, choke coil or the like, due to a rate of change of current in the coils of the other or others, is zero.

According to another feature of the invention, I mount on a single core the coils of a plurality of transformers, choke coils or the like, and so position the coils with respect to one another that there is no, or substantially no, induction from one coil or set of coils into the other.

This may be effected by mounting the coils upon a single core so that the turns of one coil or set of coils lie substantially parallel to a plane which is at right angles to the plane to which the turns of the other coil or set of coils lie substantially parallel, both these planes being at right angles to a third plane, to which the laminations, of which the core is composed, lie substantially parallel.

Preferably an electrostatic screen is arranged between the coils or sets of coils, so that capacity coupling effects are substantially eliminated.

The invention is illustrated in the accompanying drawings, in which Figure 1 shows a "double" choke in which the coils are subdivided and connected in series; Figures 2 to 5 show various constructions of "double" transformers, of which the coils are subdivided and connected in series; Figure 6 shows one construction of "double" transformer, in which the sets of coils are so arranged that there is substantially no induction from one set of coils into the other; Figures 7 and 8 show laminations used to build up the core of the transformer shown in Figure 6; Figure 9 shows an electrostatic screen suitable for insertion between the sets of coils of the transformers shown in Figure 6.

Like reference letters indicate like parts throughout the several figures of the drawings.

Referring to Figure 1, L M N O P Q is an iron core on the three limbs of which are mounted coils 1, 2. The coil 2 is mounted upon the middle limb M P, while the coil 1 is divided into halves, each half being mounted upon one of the outer limbs L Q and N O. The reluctance of the path P M L Q is substantially equal to that of the path P M N O, and the halves of the coil 1 are connected as indicated in Fig. 1 of the drawings in series opposition.

It will be seen that with this arrangement electro-motive forces induced in the halves of coil 1, due to a rate of change of current in coil 2, will be equal and opposite.

In the arrangement shown in Figure 2, P1 and S1 are the ends of the primary and secondary coils respectively of a transformer T1, which is mounted as shown upon the middle limb of a three limbed core C. A second transformer T2 is mounted upon the two outer limbs, the primary and secondary coils of the said transformer being subdivided into halves, one half primary and one half secondary being mounted on each outer limb. P2 P'2 and S2 S'2 represent the ends of the primary and secondary half coils, respectively, the said half coils being connected in series opposition, primary to primary and secondary to secondary.

With this arrangement the magnetic flux in the middle limb of the core, due to a rate of change of current in the coils P1 and S1, will divide into two parts each going round one of the outer limbs of the core, and giving rise to opposing electro-motive forces in the divided coils of the second transformer. The said divided coils and the said outer limbs of the core are so dimensioned and formed that the algebraic sum of these electro-motive forces is zero.

In general, it is preferred to accomplish this by making P2=P'2, S2=S'2, and the reluctance of the two magnetic circuits formed by the middle limb of the core with each outer limb equal.

Figures 3 and 4 show further modifications differing from the arrangements shown in Figure 2 only in the use of different forms of core and coils. The half primaries P2 and P'2 and half secondaries S2 and S'2 in the modifications shown in Figs. 3 and 4 are connected in the same manner as the half primaries and half secondaries of Figure 2. These connections being clearly shown on the drawings, further description is unnecessary.

In the arrangement shown in Figure 5, the coils of both transformers are subdivided, but the arrangement is otherwise similar to those shown in the preceding figures. In this modification the transformer T1 is made in two parts each part having a half primary and a half secondary. The two halves of the primary are connected in series opposition as are the two halves of the secondary. The transformer T2 is constructed and arranged similar to those shown in Figures 3 and 4.

Obviously, if desired, the primary and secondary coils of the transformers or chokes shown in Figures 1 to 5 may be arranged in "sandwich" fashion instead of concentrically. In another form of construction two transformers are mounted on a single core built up of laminations, the primary and secondary windings of each transformer being arranged one within the other, the mass center of the core and of each winding being substantially coincident.

In this arrangement shown in Figure 6, T1 represents the windings of one transformer or choke, and T2 those of a second. The two windings are mounted upon a single core C, built up of laminations formed as shown in Figures 7 and 8, the windings of one transformer or choke T1 passing through the holes H1, while those of T2 pass through the holes H2. The laminations are each split up as shown in Figures 7 and 8, to facilitate assembly, and in the said assembly are alternated or "interleaved" as it is generally termed, so that if any one lamination is, as shown in Figure 7, its immediate neighbors will be as shown in Figure 8. A split electrostatic screen 3 of the form shown in Figure 9 is inserted as clearly shown in Figure 6 so as to minimize electrostatic coupling, and the said screen may be grounded, if desired. By means of this electrostatic screen between the coils capacity coupling effects are substantially eliminated.

A transformer, choke or the like, constructed according to the present invention, possesses the advantage that there is obtained in a single unit a "double" transformer, choke or the like, which may be employed in place of two separate instruments usually employed hitherto, and is also more compact. Moreover, there is obviated the risk of interference between the fluxes which may occur when two separate instruments are mounted in proximity to one another.

Having described my invention, I claim:

1. A multiple transformer including a core provided with coil mounting legs, a plurality of divided transformer coils each comprising a primary and a secondary coil mounted upon said core legs, each of said coils being connected respectively by a series connection and arranged alternately on said core with respect to the coils of a second transformer and adapted to produce fluxes which compensate for the fluxes set up by the second transformer coils and vice versa.

2. A multiple transformer unit comprising a plurality of transformer coils, at least one of said coils being divided into half coils and each of said half coils comprising a primary and a secondary coil, a series connection between the said primary and secondary coils respectively, of said transformer, a laminated core upon which said separate transformers are mounted, said core being provided with legs for positioning said coils in perpendicular relationship to each other so that a change of current flowing in one transformer unit will produce no inductive effect in the other transformer unit.

3. A multiple transformer comprising a core, a pair of divided transformer coils mounted upon said core, each of said coils comprising a primary and a secondary coil connected respectively in series, a supporting leg within said core and a transformer coil mounted upon said leg and having its windings in a plane perpendicular to said first named coils, said perpendicular mounting of coils being adapted to produce a non-inductive relationship between said coils.

4. In a multiple transformer, a core, a plurality of mounting legs on said core, a plurality of transformers on said legs, one of said transformers being divided in two sections the windings of which are connected in series, all of said transformers being so wound relative to one another that they are electrically independent each from the other.

5. In radio apparatus, a laminated iron core provided with a plurality of inductance supporting legs, a plurality of sets of inductances mounted on said supporting legs some of said sets comprising subdivided portions connected in series, said sets of inductances being wound and arranged in such a manner that they are in effect electrically independent each from the other.

6. A multiple transformer including a laminated iron core, a plurality of mounting legs on said core, and a plurality of transformer inductances each comprising a primary and secondary winding mounted on said legs, the windings of each of said transformers being arranged to prevent mutual inductance between transformers.

7. In radio apparatus a laminated core, a plurality of inductance supporting legs thereon, and a plurality of sets of inductances mounted on said legs, said sets of inductances being wound and arranged so that the algebraic sum of the electromotive forces in any one of said sets of inductances due to a rate of change of current in another of said sets of inductances is zero.

8. An electrical device comprising a core provided with a plurality of inductance mounting means, a plurality of independent sets of concentric inductances mounted on said mounting means, each one of said sets of inductances being wound and arranged so that the algebraic sum of the electromotive forces in any one of said sets of inductances due to a rate of change of current in another of said sets is zero.

9. An electrical device comprising a plural legged core member, at least one inductance wound on each leg of said core, each of said inductances being so wound and so positioned on the legs relative to one another as to prevent mutual inductance between each other.

10. A radio apparatus, as defined in claim 7, some of said sets of inductances comprising subdivided portions.

11. A multiple transformer, as defined in claim 6, some of said transformer inductances comprising subdivided portions connected in series.

12. An electrical device comprising a core provided with a plurality of legs, a plurality of transformers, each including a primary and secondary winding, mounted on said legs, the windings of said transformers being so wound relative to one another, and the transformers being so positioned on the legs with respect to one another, that the windings of each transformer are electrically independent of the windings in every other transformer.

13. A multiple transformer including a core, a plurality of mounting legs on said core, and a plurality of transformer inductances each comprising a primary and secondary winding mounted on said legs, the windings of each of said transformers being arranged to prevent mutual inductance between transformers.

NEWSOME HENRY CLOUGH.